United States Patent
Nallapa et al.

(10) Patent No.: US 10,229,231 B2
(45) Date of Patent: Mar. 12, 2019

(54) SENSOR-DATA GENERATION IN VIRTUAL DRIVING ENVIRONMENT

(71) Applicant: Ford Global Technologies, LLC, Dearborn, MI (US)

(72) Inventors: Venkatapathi Raju Nallapa, Fairfield, CA (US); Martin Saeger, Pulheim (DE); Ashley Elizabeth Micks, Mountain View, CA (US); Douglas Blue, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 606 days.

(21) Appl. No.: 14/852,238

(22) Filed: Sep. 11, 2015

(65) Prior Publication Data

US 2017/0076019 A1   Mar. 16, 2017

(51) Int. Cl.
*G06F 17/50* (2006.01)
*G06F 3/01* (2006.01)
*G09B 9/04* (2006.01)

(52) U.S. Cl.
CPC .......... *G06F 17/5009* (2013.01); *G06F 3/011* (2013.01); *G06F 17/5095* (2013.01); *G09B 9/04* (2013.01)

(58) Field of Classification Search
USPC ................................. 702/2; 703/9; 701/400
See application file for complete search history.

(56) References Cited

U.S. PATENT DOCUMENTS

| | | | |
|---|---|---|---|
| 6,192,745 B1 | 2/2001 | Tang | |
| 7,278,316 B2 | 10/2007 | Satou | |
| 7,363,805 B2 | 4/2008 | Jayakumar | |
| 8,458,188 B2 | 6/2013 | Salemann | |
| 8,862,346 B2 | 10/2014 | Saltsman | |
| 2011/0164044 A1* | 7/2011 | Huang | A63B 21/0004 345/473 |
| 2014/0104424 A1* | 4/2014 | Zhang | B60R 1/00 348/148 |
| 2015/0346722 A1* | 12/2015 | Herz | G05D 1/0038 701/2 |
| 2016/0084661 A1* | 3/2016 | Gautama | G01C 21/365 701/400 |

FOREIGN PATENT DOCUMENTS

WO   WO-2015011251 A1   1/2015

* cited by examiner

*Primary Examiner* — Thai Q Phan
(74) *Attorney, Agent, or Firm* — David R. Stevens; Stevens Law Group

(57) ABSTRACT

A method for generating training data. The method may include executing a simulation process. The simulation process may include traversing one or more virtual sensors over a virtual road surface defining a plurality of virtual anomalies that are each sensible by the one or more virtual sensors. During the traversing, each of the one or more virtual sensors may be moved with respect to the virtual road surface as dictated by a vehicle-motion model modeling motion of a vehicle driving on the virtual road surface while carrying the one or more virtual sensors. Virtual sensor data characterizing the virtual road surface may be recorded. The virtual sensor data may correspond to what a real sensor would have output had it sensed the road surface in the real world.

5 Claims, 5 Drawing Sheets

SENSOR-DATA GENERATION IN VIRTUAL DRIVING ENVIRONMENT

BACKGROUND

Field of the Invention

This invention relates to vehicular systems and more particularly to systems and methods for generating training data suitable for use in developing, training, and proving algorithms for detecting anomalies in a driving environment.

Background of the Invention

To provide, enable, or support functionality such as driver assistance, controlling vehicle dynamics, and/or autonomous driving, well proven algorithms for interpreting sensor data are vital. Accordingly, what is needed is a system and method for generating training data suitable for use in developing, training, and proving such algorithms.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
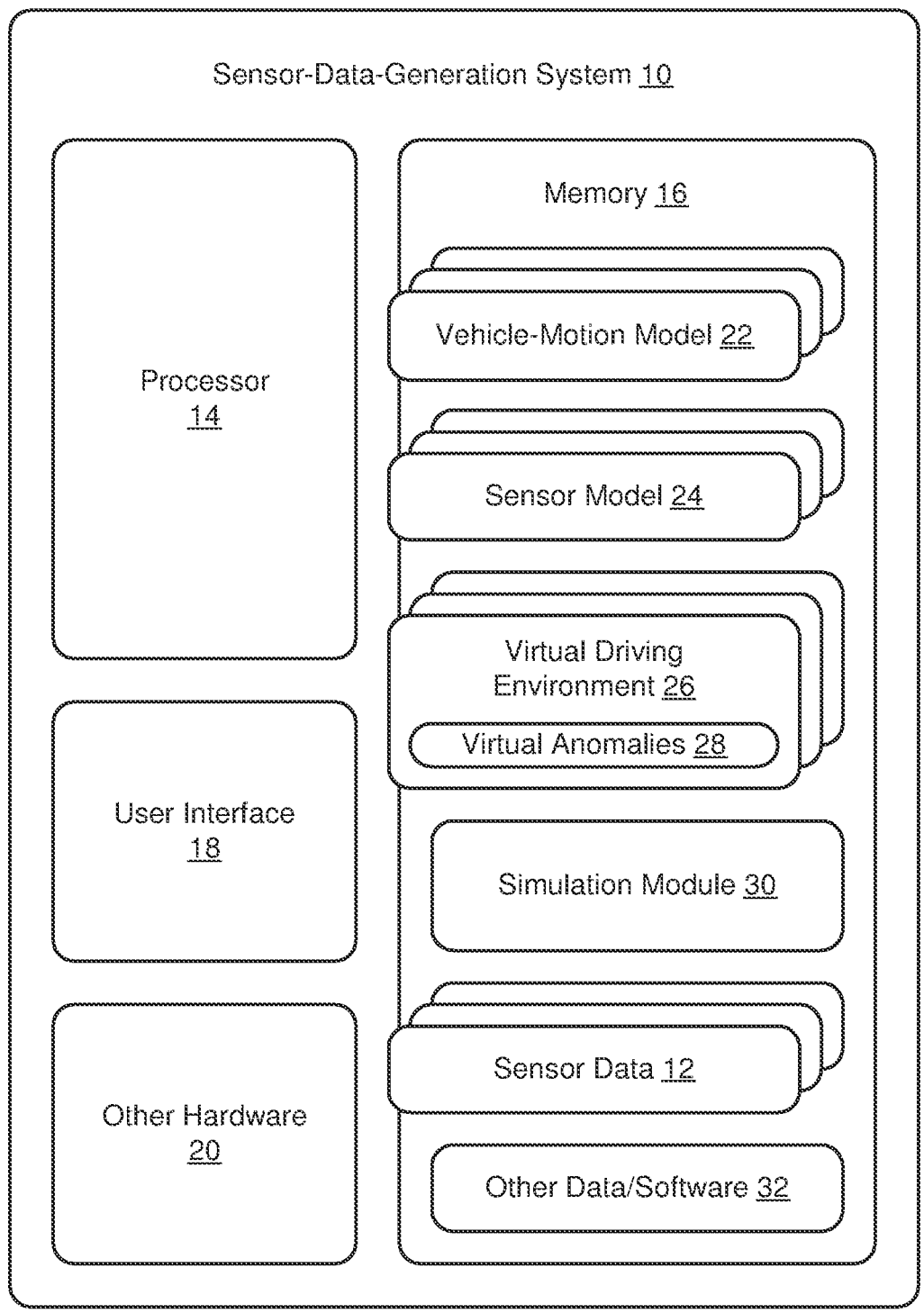
FIG. 1 is a schematic block diagram illustrating one embodiment of a sensor-data-generation system in accordance with the present invention.

Referring to FIG. 1, the real world presents an array of conditions and obstacles that are ever changing. This reality creates significant challenges for vehicle-based systems providing autonomous control of certain vehicle dynamics and/or autonomous driving. To overcome these challenges, a vehicle may be equipped with sensors and computer systems that collectively sense, interpret, and appropriately react to a surrounding environment. Key components of such computer systems may be one or more algorithms used to interpret data output by various sensors carried on-board such vehicles.

For example, certain algorithms may analyze one or more streams of sensor data characterizing an area ahead of a vehicle and recognize when an anomaly is present in that area. Other algorithms may be responsible for deciding what to do when an anomaly is detected. To provide a proper response to such anomalies, all such algorithms must be well developed and thoroughly tested. In selected embodiments, an initial and significant portion of such development and testing may be accomplished in a virtual environment. Accordingly, a system 10 in accordance with the present invention may produce sensor data 12 suitable for developing, testing, and/or training various algorithms.

For example, in certain embodiments, a system 10 may execute a simulation in order to produce sensor data 12 suitable for developing, testing, and/or training various anomaly-recognition algorithms. A system 10 may do this in any suitable method. For example, a system 10 may be embodied as hardware, software, or some combination thereof.

In selected embodiments, a system 10 may include computer hardware and computer software. The computer hardware of a system 10 may include one or more processors 14, memory 16, a user interface 18, other hardware 20, or the like or a combination or sub-combination thereof. The memory 16 may be operably connected to the one or more processors 14 and store the computer software. This may enable the one or more processors 14 to execute the computer software.

A user interface 18 of a system 10 may enable an engineer, technician, or the like to interact with, run, customize, or control various aspects of a system 10. In selected embodiments, a user interface 18 of a system 10 may include one or more keypads, keyboards, touch screens, pointing devices, or the like or a combination or sub-combination thereof.

In selected embodiments, the memory 16 of a computer system 12 may store one or more vehicle-motion models 22, one or more sensor models 24, one or more virtual driving environments 26 containing various virtual anomalies 28, a simulation module 30, sensor data 12, other data or software 32, or the like or combinations or sub-combinations thereof.

A vehicle-motion model 22 may be a software model that may define for certain situations the motion of the body of a corresponding vehicle. In certain embodiments, a vehicle-motion model 22 may be provided with one or more driver inputs (e.g., one or more values characterizing things such as velocity, drive torque, brake actuation, steering input, or the like or combinations or sub-combinations thereof) and information (e.g., data from a virtual driving environment 26) characterizing a road surface. With these inputs and information, a vehicle-motion model 22 may predict motion states of the body of a corresponding vehicle.

The parameters of a vehicle-motion model 22 may be determined or specified in any suitable manner. In selected embodiments, certain parameters of a vehicle-motion model 22 may be derived from previous knowledge of the mechanical properties (e.g., geometries, inertia, stiffness, damping coefficients, etc.) of a corresponding real-world vehicle.

As appreciated, the parameters may be different for different vehicles. Accordingly, in selected embodiments, a vehicle-motion model 22 may be vehicle specific. That is, one vehicle-motion model 22 may be suited to model the body dynamics of a first vehicle (e.g., a particular sports car), while another vehicle-motion model 22 may be suited to model the body dynamics of a second vehicle (e.g., a particular pickup truck).

A sensor model 24 may be a software model that may define or predict for certain situations or views the output of a corresponding real-world sensor. In certain embodiments, a sensor model 24 may be provided with information (e.g., data from a virtual driving environment 26) characterizing various views of a road surface. With this information, a sensor model 24 may predict what an actual sensor presented with those views in the real world would output.

In selected embodiments, real world sensors of interest may comprise transducers that sense or detect some characteristic of an environment and provide a corresponding output (e.g., an electrical or optical signal) that defines that characteristic. For example, one or more real world sensors of interest may be accelerometers that output an electrical signal characteristic of the proper acceleration being experienced thereby. Such accelerometers may be used to determine the orientation, acceleration, velocity, and/or distance traveled by a vehicle. Other real world sensors of interest may include cameras, laser scanners, lidar scanners, ultrasonic transducers, radar devices, gyroscopes, inertial measurement units, revolution counters or sensors, strain gauges, temperature sensors, or the like.

A sensor model 24 may model the output produced by any real world sensor of interest. As appreciated, the outputs may be different for different real world sensors. Accordingly, in selected embodiments, a sensor model 24 may be sensor specific. That is, one sensor model 24 may be suited to model the output of a first sensor (e.g., a particular camera), while another sensor model 24 may be suited to model the output of a second sensor (e.g., a particular laser scanner).

A sensor model 24 may produce an output of any suitable format. For example, in selected embodiments, a sensor model 24 may output a signal (e.g., analog signal) that a corresponding real-world sensor would produce. Alternatively, a sensor model 24 may output a processed signal. For example, a sensor model 24 may output a processed signal such as that output by a data acquisition system. Accordingly, in selected embodiments, the output of a sensor model 24 may be a conditioned, digital version of the signal that a corresponding real-world sensor would produce.

A simulation module 30 may be programmed to use a virtual driving environment 26, a vehicle-motion model 22, and one or more sensor models 24 to produce an output (e.g., sensor data 12) modeling what would be output by one or more corresponding real world sensors had the one or more real world sensors been mounted to a vehicle (e.g., the vehicle modeled by the vehicle-motion model 22) driven on an actual driving environment like (e.g., substantially or exactly matching) the virtual driving environment 26.

Figure 2:
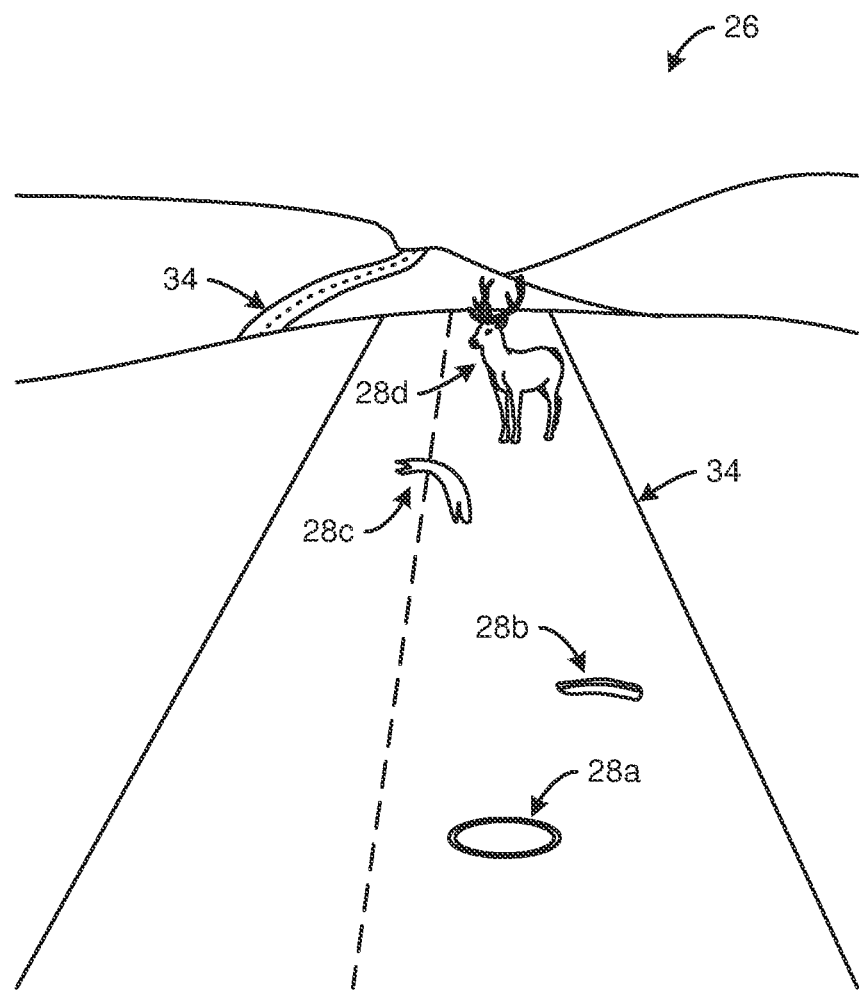
FIG. 2 is a schematic diagram illustrating one embodiment of a virtual driving environment including anomalies in accordance with the present invention.

Referring to FIG. 2, in selected embodiments, a virtual driving environment 26 may comprise a three dimensional mesh defining in a virtual space, a driving surface 34 (e.g., road), and various anomalies 28 distributed (e.g., randomly distributed) across the driving surface 34. The anomalies 28 in a virtual driving environment 26 may model features or objects that intermittently or irregularly affect the operation of vehicles in the real world. Anomalies 28 included within a virtual driving environment 26 may be of different types.

For example, certain anomalies 28a may model features that are typically intentionally included within real world driving surfaces. These anomalies 28a may include manholes and manhole covers, speed bumps, gutters, lines or text painted onto or otherwise adhered to a driving surface 34, road signs, traffic lights, crack sealant, seams in paving material, changes in paving material, and the like. Other anomalies 28b may model defects in a driving surface 34. These anomalies 28b may include potholes, cracks, frost heaves, ruts, washboard surfaces, and the like. Other anomalies 28c may model inanimate objects resting on a driving surface 34. These anomalies 28c may include road kill, pieces of delaminated tire tread, trash, debris, fallen vegetation, or the like.

Still other anomalies 28d may model animate objects. Animate objects may be things in the real world that change their position with respect to a driving surface 34 over a relatively short period of time. Examples of animate objects may include animals, pedestrians, other vehicles, tumbleweeds, or the like. In selected embodiments, anomalies 28d that model animate objects may be included within a virtual driving environment 26 in an inanimate form. That is, they may be stationary within the virtual driving environment 26. Alternatively, anomalies 28d that model animate objects may be included within a virtual driving environment 26 in an animate form and may move within that environment 26. This may enable sensor data 12 in accordance with the present invention to be used in developing, training, or the like algorithm for tracking various anomalies 28.

Figure 3:
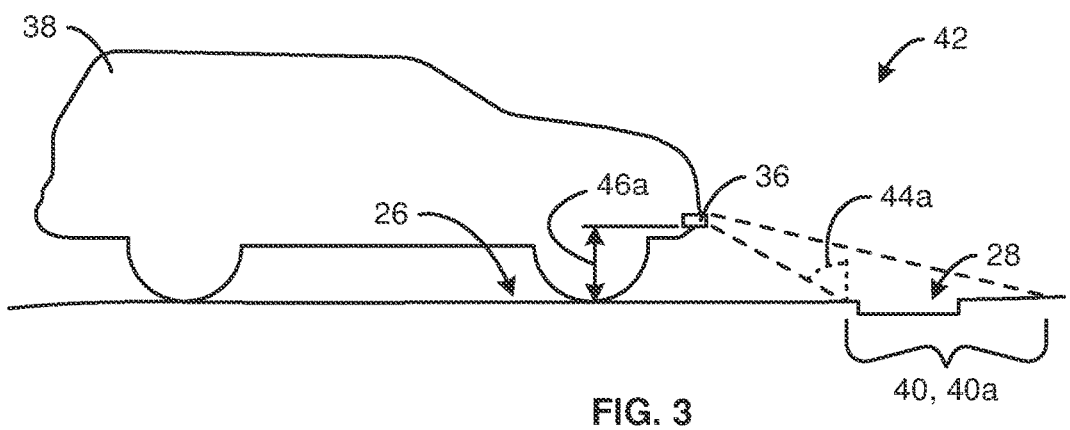
FIG. 3 is a schematic diagram illustrating a virtual vehicle at a first instant in time in which one or more virtual sensors are "viewing" a pothole located ahead of the vehicle.
Figure 4:
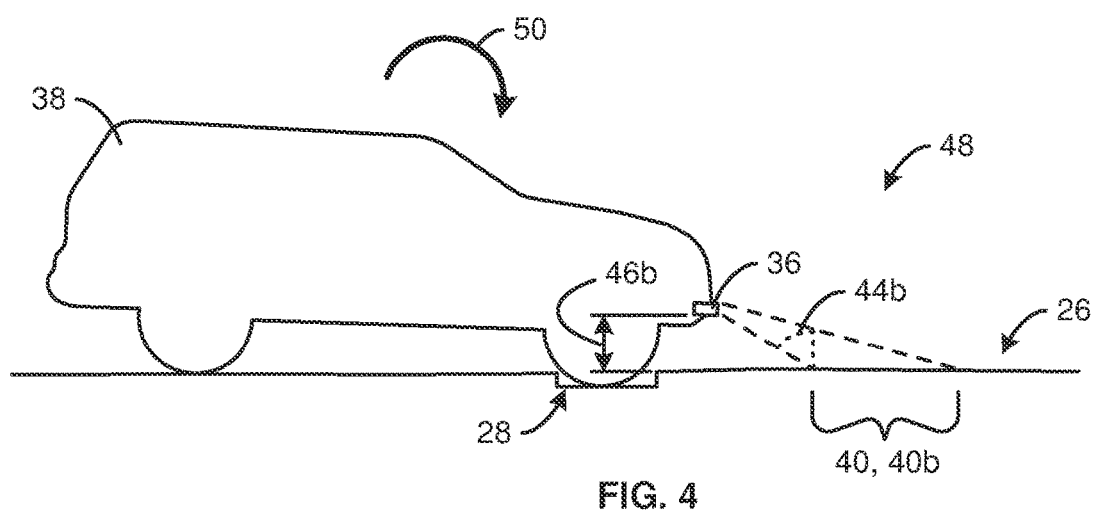
FIG. 4 is a schematic diagram illustrating the virtual vehicle of FIG. 3 at a second, subsequent instant in time in which the vehicle is encountering (e.g., driving over) the pothole.

Referring to FIGS. 3 and 4, through a series of calculations, a simulation module 30 may effectively traverse one or more virtual sensors 36 over a virtual driving environment 26 (e.g., a road surface 34 of a virtual driving environment 26) defining or including a plurality of virtual anomalies 28 that are each sensible by the one or more virtual sensors 36. In selected embodiments, this may include manipulating during such a traverse a point of view of the one or more virtual sensors 36 with respect to the virtual driving environment 26. More specifically, it may include moving during such a traverse each of the one or more virtual sensors 36 with respect to the virtual driving environment 26 as dictated by a vehicle-motion model 22 modeling motion of a corresponding virtual vehicle 38 driving in the virtual driving environment 26 while carrying the one or more virtual sensors 36.

In selected embodiments, to properly account for the motion of the one or more virtual sensors 36, a simulation module 30 may take into consideration three coordinate systems. The first may be a global, inertial coordinate system within a virtual driving environment 26. The second may be an undisturbed coordinate system of a virtual vehicle 38 defined by or corresponding to a vehicle-motion model 22. This may be the coordinate system of an "undisturbed" version of the virtual vehicle 38, which may be defined as having its "xy" plane parallel to a ground plane (e.g., an estimated, virtual ground plane). The third may be a disturbed coordinate system of the vehicle 38. This may be the coordinate system of the virtual vehicle 38 performing roll, pitch, heave, and yaw motions which can be driver-induced (e.g., caused by virtualized steering, braking, accelerating, or the like) or road-induced (e.g., caused by a virtual driving environment 26 or certain virtual anomalies 28 therewithin) or due to other virtual disturbances (e.g., side wind or the like). A simulation module 30 may use two or more of these various coordinate systems to determine which views 40 or scenes 40 pertain to which virtual sensors 36 during a simulation process.

That is, in the real world, the sensors modeled by one or more sensor models 24 may be carried on-board a corresponding vehicle. Certain such sensors may be secured to move with the body of a corresponding vehicle. Accordingly, the view or scene surveyed by sensors such as cameras, laser scanners, ultrasonic devices, radars, or the like may be change depending on the orientation of the corresponding vehicle with respect to the surrounding environment. For example, if a vehicle rides over a bumpy road, a forward-looking sensor (e.g., a vehicle-mounted camera, laser sensor, or the like monitoring the road surface ahead of the vehicle) may register or sense the same portion of road at different angles, depending on the current motion state of the vehicle.

To simulate such effects in a system 10 in accordance with the present invention, a simulation module 30 may take into consideration the location and orientation of one or more virtual sensors 36 (e.g., sensors being modeled by one or more corresponding sensor models 24) within a coordinate system corresponding to the virtual vehicle 38 (e.g., the vehicle being modeled by the vehicle-motion model 22). A simulation module 30 may also take into consideration how such a vehicle-based coordinate system is disturbed in the form of roll, pitch, heave, and yaw motions predicted by a vehicle-motion model 22 based on virtualized driver inputs, road inputs defined by a virtual driving environment 26, and the like. Accordingly, for any simulated moment in time that is of interest, a simulation module 30 may calculate a location and orientation of a particular virtual sensor 36 with respect to a virtual driving environment 26 and determine the view 40 within the virtual driving environment 26 to be sensed at that moment by that particular virtual sensor 36.

For example, in a first simulated instant 42, a forward-looking virtual sensor 36 may have a particular view 40*a* of a virtual driving environment 26. In selected embodiments, this view 40*a* may be characterized as having a first angle of incidence 44*a* with respect to the virtual driving environment 26 and a first spacing 46*a* in the normal direction from the virtual driving environment 26. In the illustrated embodiment, this particular view 40*a* encompasses a particular anomaly 28, namely a pothole.

However, in a second, subsequent simulated instant 48, a virtual vehicle 38 may have pitched forward 50 due to modeled effects associated with driving through the previously viewed virtual anomaly 28 (i.e., pothole). Accordingly, in the second instant 48, the forward-looking sensor 36 may have a different view 40*b* of a virtual driving environment 26. Due to the pitching forward 50, this view 40*b* may be characterized as having a second, lesser angle of incidence 44*b* with respect to the virtual driving environment 26 and a second, lesser spacing 46*b* in the normal direction from the virtual driving environment 26.

Figure 5:
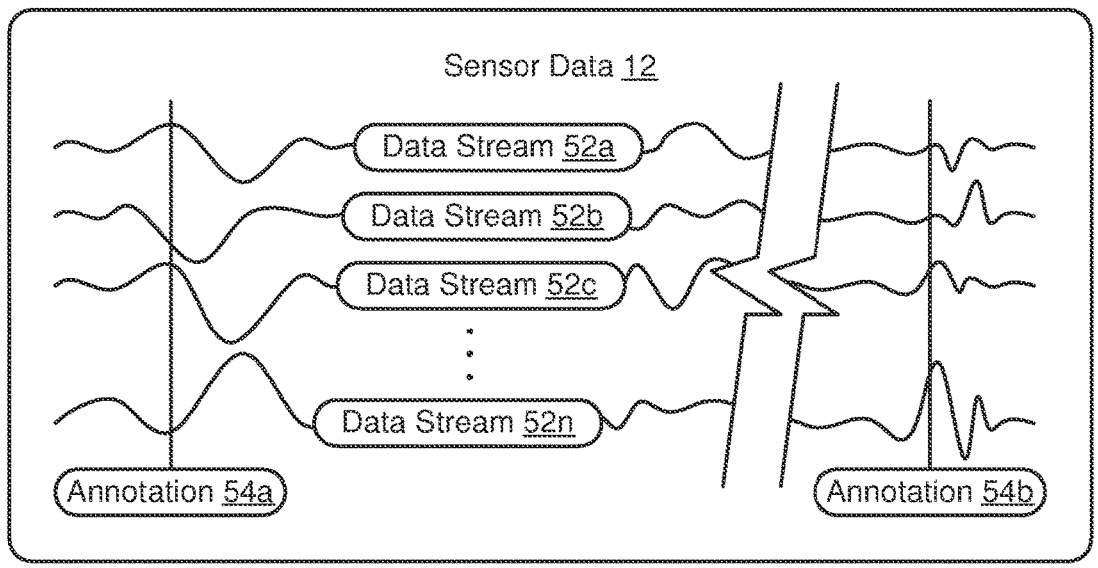
FIG. 5 is a schematic diagram illustrating one embodiment of sensor data tagged with one or more annotations in accordance with the present invention.
Figure 6:
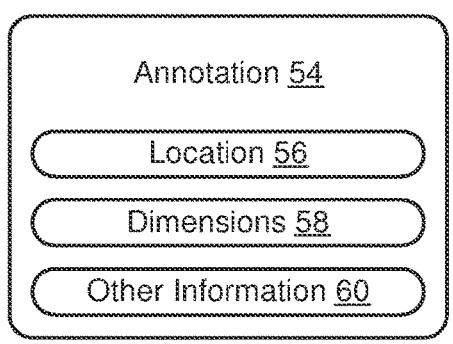
FIG. 6 is a schematic block diagram illustrating one embodiment of an annotation in accordance with the present invention.

Referring to FIGS. 5 and 6, for a first simulated moment in time, a simulation module 30 may determine the view 40 of the virtual driving environment 26 to be sensed at that moment by a particular virtual sensor 36. A simulation module 30 may then obtain from an appropriate sensor model 24 an output that characterizes that view 40. This process may be repeated for a second simulated moment in time, a third simulated moment in time, and so forth. Accordingly, by advancing from one moment in time to the next, a simulation module 30 may obtain a data stream 52 modeling what would be the output of the particular virtual sensor 36 had it and the corresponding virtual driving environment 26 been real.

This process may be repeated for all of the virtual sensors 36 corresponding to a particular virtual vehicle 38. Accordingly, for the particular virtual vehicle 38 and the virtual driving environment 26 that is traversed, sensor data 12 comprising one or more data streams 52 may be produced.

In selected embodiments, different data streams 52 may represent the output of different virtual sensors 36. For example, a first data stream 52*a* may represent the output of a first virtual camera mounted on the front-right portion of a virtual vehicle 38, while a second data stream 52*b* may represent the output of a second virtual camera mounted on the front-left of the virtual vehicle 38. Collectively, the various data streams 52 forming the sensor data 12 for a particular run (e.g., a particular virtual traverse of a particular virtual vehicle 38 through a particular virtual driving environment 26) may represent or account for all the inputs that a particular algorithm (i.e., the algorithm that is being developed or tested) would use in the real world.

In certain embodiments or situations, a simulation module 30 may couple sensor data 12 with one or more annotations 54. Each such annotation 54 may provide "ground truth" corresponding to the virtual driving environment 26. In selected embodiments, the ground truth contained in one or more annotations 54 may be used to quantify an algorithm's performance in classifying anomalies 28 in a supervised learning technique.

For example, one or more annotations 54 may provide true locations 56, true dimensions 58, other information 60, or the like or combinations thereof corresponding to the various anomalies 28 encountered by a virtual vehicle 38 in a particular run. Annotations 54 may be linked, tied to, or otherwise associated with particular portions of the data streams 52. Accordingly, the ground truth corresponding to a particular anomaly 28 may be linked to the portion of one or more data streams 54 that reflect the perception of one or more virtual sensors 36 of that anomaly 28. In selected embodiments, this may be accomplished by linking different annotations 54*a*, 54*b* to different portions of one or more data streams 52.

Figure 7:
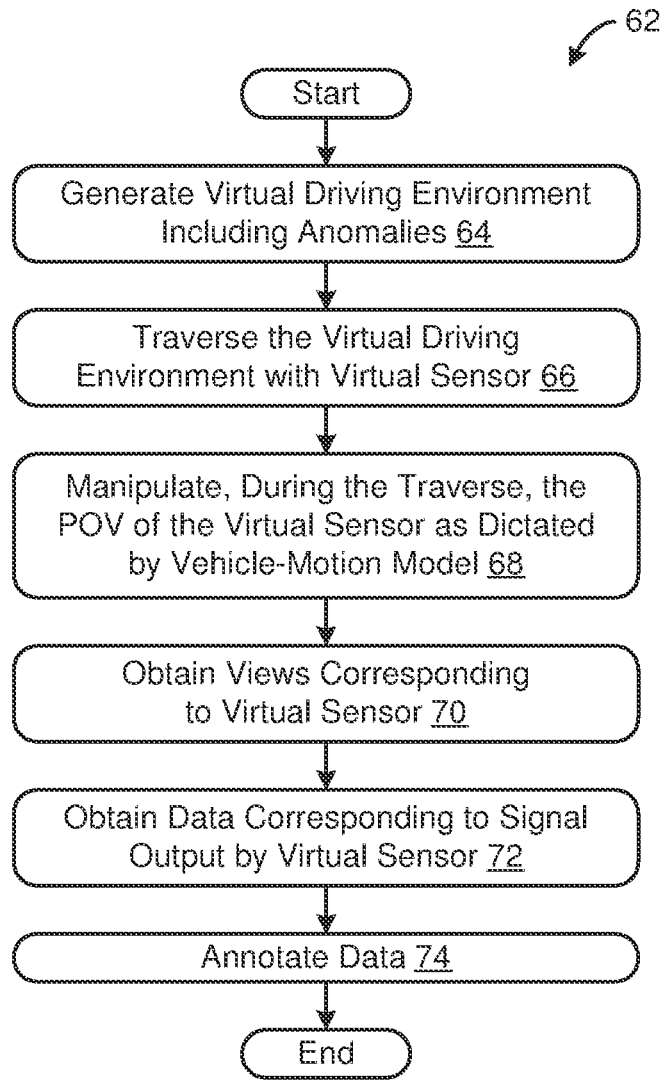
FIG. 7 is a schematic block diagram of one embodiment of a method for generating training data in accordance with the present invention.

Referring to FIG. 7, a system 10 may support, enable, or execute a process 62 in accordance with the present invention. In selected embodiments, such a process 62 may begin with generating 64 a virtual driving environment 26 including various anomalies 28. The virtual driving environment 26 may then by traversed 66 in a simulation process with one or more virtual sensors 36.

As the virtual driving environment 26 is traversed 66 with one or more virtual sensors 36, the point of view of the one or more virtual sensor 36 onto the virtual driving environment 26 may be manipulated 68 as dictated by a vehicle-motion model 22. Accordingly, the various views 40 corresponding to the one or more virtual sensors 36 at various simulated moments in time may be obtained 70 or identified 70. The various views 40 thus obtained 70 or identified 70 may be analyzed by or via corresponding sensor models 24 in order to obtain 72 data 12 reflecting what a corresponding real sensor viewing the various views 40 in the real world would have produced or output. In selected embodiments, this data 12 may be annotated 74 with ground truth information to support or enable certain supervised learning techniques.

The flowchart in FIG. 7 illustrates the architecture, functionality, and operation of a possible implementation of a system, method, and computer program product according to one embodiment of the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A computer system comprising:
one or more processors;
memory operably connected to the one or more processors; and
the memory storing
a virtual driving environment programmed to include a plurality of virtual anomalies,
a first software model programmed to model a sensor,
a second software model programmed to model a vehicle, and
a simulation module programmed to use the virtual driving environment, the first software model, and the second software model to produce an output modeling what would be output by the sensor had the sensor been mounted to the vehicle and the vehicle had driven on an actual driving environment matching the virtual driving environment, the simulation module being programmed to:
simulate traversing one or more virtual sensors over a virtual road surface, the virtual road surface defining a plurality of virtual anomalies that are each sensible by the one or more virtual sensors, and
simulate moving, during the traversing, each of the one or more virtual sensors with respect to the virtual road surface as dictated by a vehicle-motion model modeling motion of a vehicle driving on the virtual road surface while carrying the one or more virtual sensors and while manipulating during the traversing, a point of view of the one or more virtual sensors with respect to the virtual road surface;
record data characterizing the virtual road surface, the data corresponding to signal output by the one or more virtual sensors during the traversing; and
train an anomaly-recognition algorithm using the data corresponding to signal output by the one or more virtual sensors during the traversing;
wherein the manipulating further comprises changing a spacing in a normal direction between the virtual road surface and the one or more virtual sensors.

2. The computer system of claim 1, wherein the sensor comprises a forward-looking sensor positioned to sense an area ahead of the vehicle.

3. The computer system of claim 2, wherein the memory further stores the output.

4. The computer system of claim 3, wherein the output comprises first data characterizing a first portion of the virtual driving environment as perceived by the first software model.

5. The computer system of claim 4, wherein:
the output further comprises an annotation characterizing the first portion of the virtual driving environment as it is actually defined in the virtual driving environment;
the first portion of the virtual road surface comprises a first virtual anomaly of the plurality of virtual anomalies; and
the annotation comprises information defining a location and size of the first virtual anomaly.

* * * * *